US012224110B2

(12) United States Patent
Teng et al.

(10) Patent No.: US 12,224,110 B2
(45) Date of Patent: Feb. 11, 2025

(54) TRANSFORMER

(71) Applicant: Delta Electronics, Inc., Taoyuan (CN)

(72) Inventors: Ching-Hsien Teng, Taoyuan (TW); Chun-Ching Yen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 707 days.

(21) Appl. No.: 17/402,119

(22) Filed: Aug. 13, 2021

(65) Prior Publication Data

US 2022/0336147 A1 Oct. 20, 2022

(30) Foreign Application Priority Data

Apr. 16, 2021 (CN) ......................... 202110412540.0

(51) Int. Cl.
*H01F 27/24* (2006.01)
*H01F 27/28* (2006.01)
*H01F 27/34* (2006.01)

(52) U.S. Cl.
CPC ........... *H01F 27/346* (2013.01); *H01F 27/24* (2013.01); *H01F 27/2823* (2013.01)

(58) Field of Classification Search
CPC .... H01F 27/346; H01F 27/24; H01F 27/2823; H01F 27/2885; H01F 27/325
USPC ............................................ 336/84 R, 84 M
See application file for complete search history.

(56) References Cited

U.S. PATENT DOCUMENTS

2003/0076211 A1 * 4/2003 Matsuta .............. H01F 27/2804 336/200

FOREIGN PATENT DOCUMENTS

CN 211555646 U 9/2020
ES 1229314 U * 5/2019 ......... H01F 27/2885
TW M-558984 U 4/2018

OTHER PUBLICATIONS

Office Action mailed Oct. 12, 2021 in TW Application No. 110113669 is attached, 8 pages.

* cited by examiner

*Primary Examiner* — Tuyen T Nguyen
(74) *Attorney, Agent, or Firm* — Muncy, Geissler, Olds & Lowe, P.C

(57) ABSTRACT

A transformer is provided, including a core, a primary conductor, a magnetic member, and a secondary conductor. The core includes a central pillar and at least one lateral pillar. An accommodating space is formed between the central pillar and the lateral pillar. The primary conductor, the magnetic member, and the secondary conductor are disposed in the accommodating space. The primary conductor surrounds the central pillar. The magnetic member surrounds the primary conductor, and the secondary conductor surrounds the magnetic member. The magnetic member is disposed between the primary conductor and the secondary conductor, and is flexible.

12 Claims, 6 Drawing Sheets

T

A-A

TRANSFORMER

CROSS REFERENCE TO RELATED APPLICATIONS

This application claims the benefit of China Patent Application No. 202110412540.0, filed Apr. 16, 2021, the entirety of which is incorporated by reference herein.

BACKGROUND OF THE INVENTION

Field of the Invention

The application relates in general to a transformer, and in particular, to a transformer having a flexible magnetic member.

Description of the Related Art

There are a lot of electronic components in an electronic apparatus, an important one being the transformer. A transformer is primarily used to transform drive voltage from circuits. For example, a power transformer can lower voltage, and step-up transformers in an AC adapter module of a notebook computer can raise the operating voltage from the circuits. Therefore, there are various types of transformers, made for various functions. Most transformers are customized according to the needs of customers.

The electronic components in an electronic apparatus may also include the inductor. The inductor and the transformer may be required to have different leakage inductances. In a conventional electronic component, the coil in the electronic component is affixed in a predetermined position according to the required leakage inductance. However, this method wastes space, and one cannot finely adjust the leakage inductance. Therefore, how to address the aforementioned problem has become an important issue.

BRIEF SUMMARY OF INVENTION

To address the deficiencies of conventional products, an embodiment of the invention provides a transformer, including a core, a primary conductor, a magnetic member, and a secondary conductor. The core includes a central pillar and at least one lateral pillar, and an accommodating space is formed between the central pillar and the lateral pillar. The primary conductor, the magnetic member, and the secondary conductor are disposed in the accommodating space. The primary conductor surrounds the central pillar, the magnetic member surrounds the primary conductor, and the secondary conductor surrounds the magnetic member. The magnetic member is disposed between the primary conductor and the secondary conductor, and is flexible.

In some embodiments, the transformer further comprises a winding frame, and the winding frame comprises a tube portion, an upper extending portion, and a lower extending portion. The upper extending portion is connected to one end of the tube portion, and protrudes from the outer surface of the tube portion. The lower extending portion is connected to the opposite end of the tube portion, and protrudes from the outer surface of the tube portion. The primary conductor, the magnetic member, and the secondary conductor are disposed between the upper extending portion and the lower extending portion.

In some embodiments, the magnetic member is in contact with the upper extending portion and the lower extending portion. The central pillar passes through the tube portion, and the upper extending portion is disposed between the central pillar and the lateral pillar.

In some embodiments, the magnetic member comprises a magnetic layer and an adhesive layer, the magnetic layer is disposed between the primary conductor and the adhesive layer, and the magnetic layer is attached to the adhesive layer. The adhesive layer is only adhesive on the surface facing the magnetic layer.

In some embodiments, the magnetic member further comprises an additional adhesive layer, the magnetic layer is disposed between the adhesive layer and the additional adhesive layer, and the magnetic layer is attached to the additional adhesive layer. In some embodiments, the additional adhesive layer is only adhesive on the surface facing the magnetic layer. In some embodiments, the additional adhesive layer is adhesive on the surface facing the magnetic layer as well as the surface facing the primary conductor.

In some embodiments, the transformer further comprises an additional magnetic member disposed between the magnetic member and the secondary conductor, and the magnetic member and the additional magnetic member are integrally formed as one piece.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the transformer are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

The following disclosure provides many different embodiments, or examples, for implementing different features of the subject matter provided. Specific examples of solutions and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. Furthermore, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1:
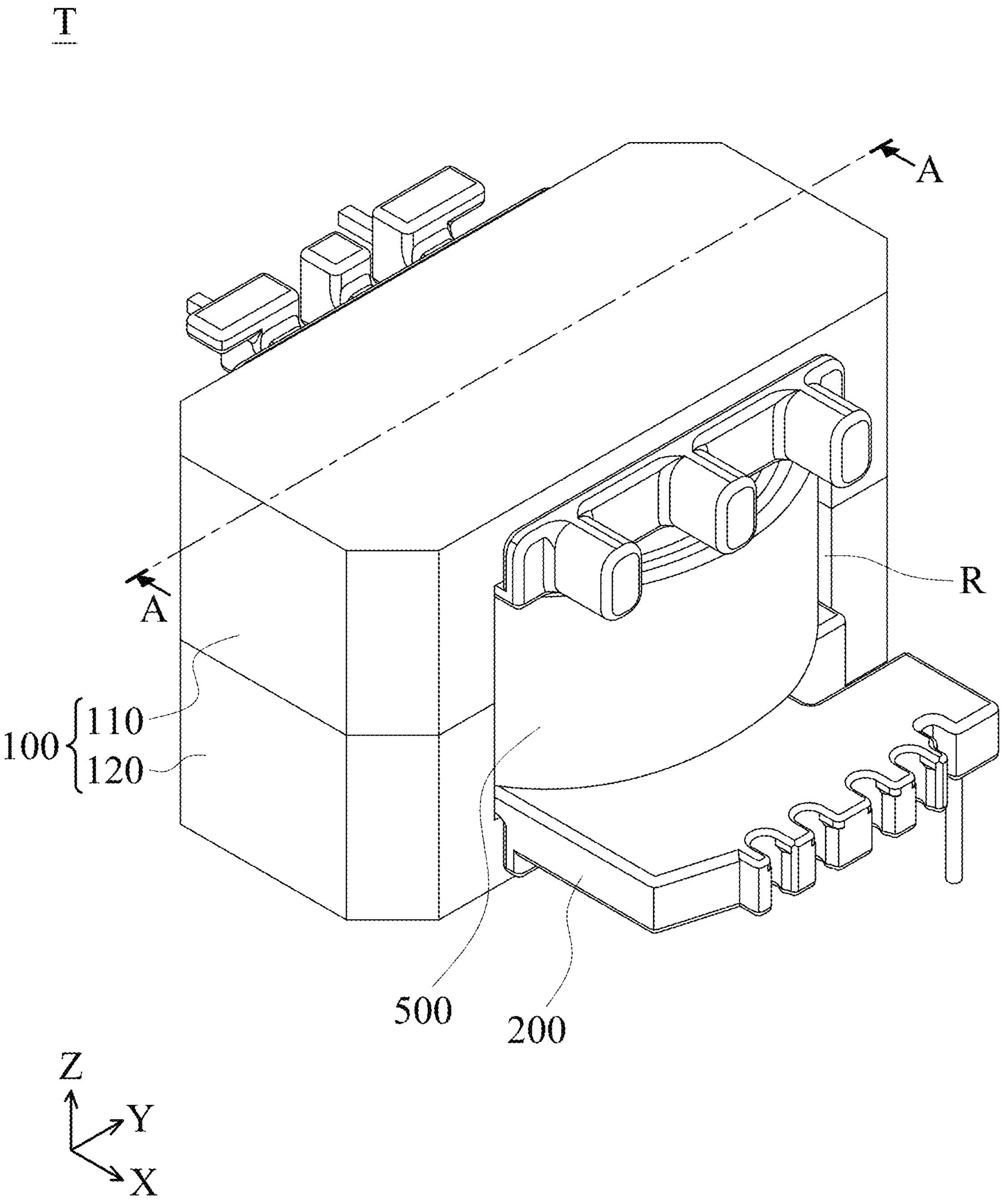
FIG. 1 is a schematic diagram of a transformer according to an embodiment of the invention.
Figure 2:
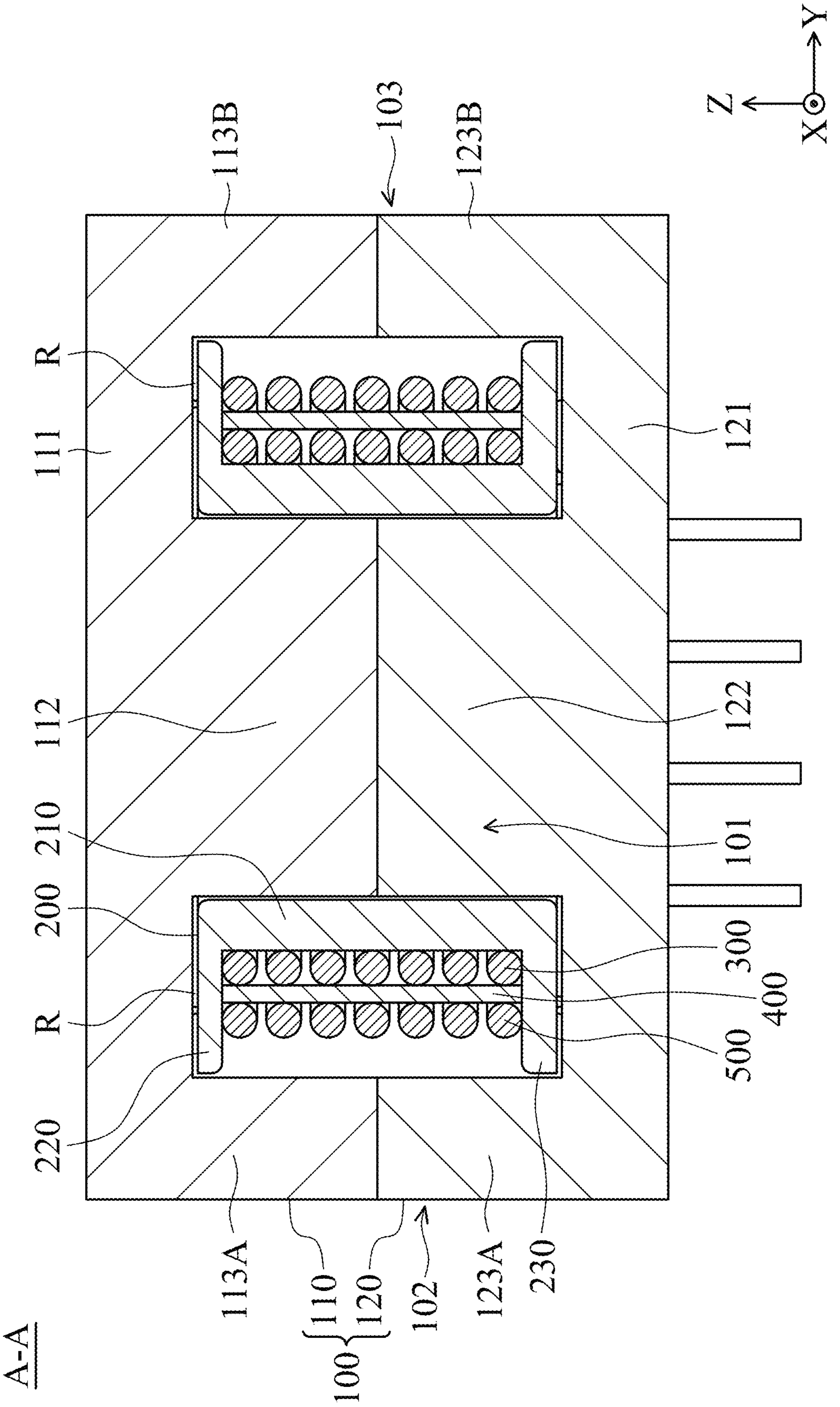
FIG. 2 is a cross-sectional view along line A-A in FIG. 1.

FIG. 1 is a schematic diagram of a transformer T according to an embodiment of the invention, and FIG. 2 is a cross-sectional view along line A-A in FIG. 1. In this embodiment, the transformer T has the functions of the transformer and the inductor (such as the resonant inductor). In other words, the transformer T can adjust the voltage of the output current, and can prevent the ripple, remove the noise, reduce the electromagnetic interference (EMI), and/or converse the power.

Referring to FIG. 1 and Fig. 2, the transformer T primarily includes a core 100, a winding frame 200, a primary conductor 300, a magnetic member 400, and a secondary conductor 500. The core 100 is formed by engaging an upper core 110 and a lower core 120.

The upper core 110 has an E-shaped structure. In detail, the upper core 110 includes a top plate 111, a protrusion 112, and two protruding portions 113A and 113B. The protrusion 112 and the protruding portions 113A and 113B are connected to the top plate 111, and protrude from the lower surface of the top plate 111. The protrusion 112 is substantially disposed at the center of the top plate 111, and two protruding portions 113A and 113B are respectively disposed on the opposite ends of the top plate 111. The protrusion 112, the protruding portion 113A, and the protruding portion 113B are separated from each other.

Similarly, the lower core 120 has an E-shaped structure. In detail, the lower core 120 includes a bottom plate 121, a protrusion 122, and two protruding portions 123A and 123B. The protrusion 122 and the protruding portions 123A and 123B are connected to the bottom plate 121, and protrude from the upper surface of the bottom plate 121. The protrusion 122 is substantially disposed at the center of the bottom plate 121, and two protruding portions 123A and 123B are respectively disposed on the opposite ends of the bottom plate 121. The protrusion 122, the protruding portion 123A, and the protruding portion 123B are separated from each other.

When the upper core 110 and the lower core 120 are engaged to form the core 100, the protrusion 112 can be aligned with the protrusion 122 to form a central pillar 101 of the core 100, the protruding portion 113A can be aligned with the protruding portion 123A to form a lateral pillar 102 of the core 100, and the protruding portion 113B can be aligned with the protruding portion 123B to form a lateral pillar 103. Since the protrusion 122, the protruding portion 123A, and the protruding portion 123B are separated from each other, the central pillar 101 is separated from the lateral pillar 102 and the lateral pillar 103, and an accommodating space R is formed between the central pillar 101 and the lateral pillar 102, and between the central pillar 101 and the lateral pillar 103.

As shown in FIG. 1 and FIG. 2, the winding frame 200 includes a tube portion 210, an upper extending portion 220, and a lower extending portion 230. The upper extending portion 220 and the lower extending portion 230 are connected to the tube portion 210, and protrude from the outer surface of the tube portion 210. The winding frame 200 is disposed in the accommodating space R of the core 100, and the central pillar 101 passes through the tube portion 210 of the winding frame 200.

The primary conductor 300, the magnetic member 400, and the secondary conductor 500 are disposed in the accommodating space R of the core 100, and disposed between the upper extending portion 220 and the lower extending portion 230. During assembling, the primary conductor 300 can firstly wind around the outer surface of the tube portion 210, and the magnetic member 400 can then wind around the primary conductor 300. Finally, the secondary conductor 500 can wind around the magnetic member 400. Therefore, the primary conductor 300 is disposed between the central pillar 101 and the magnetic member 400, and the magnetic member 400 is disposed between the primary conductor 300 and the secondary conductor 500.

It should be noted that the width of the magnetic member 400 is substantially the same as the distance between the upper extending portion 220 and the lower extending portion 230. Thus, when the magnetic member 400 is disposed in the accommodating space R of the core 100, the magnetic member 400 is in contact with the upper extending portion 220 and the lower extending portion 230. The primary conductor 300, the magnetic member 400, and the secondary conductor 500 can be securely affixed, and the contact between the primary conductor 300 and the secondary conductor 500 can be avoided so as to prevent a short-circuit.

For example, the primary conductor 300 and the secondary conductor 500 can be wires or include other suitable conductive material. It should be noted that, in this embodiment, both the primary conductor 300 and the secondary conductor 500 are wires, and the diameter of the wire of the primary conductor 300 is different from the diameter of the wire of the secondary conductor 500. After the primary conductor 300 and the secondary conductor 500 wind around the central pillar 101 by the aforementioned method, the primary conductor 300 and the secondary conductor 500 are arranged along the Y-axis. Therefore, the arranged direction of the primary conductor 300 and the secondary conductor 500 is perpendicular to the extending direction of the central pillar 101 (the Z-axis).

Figure 3:
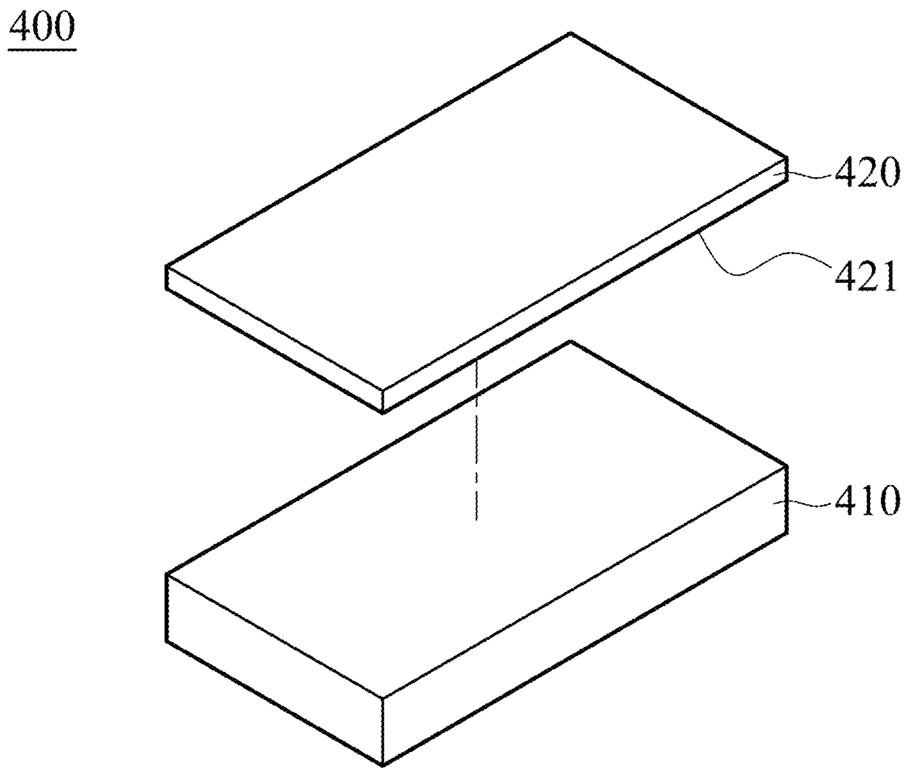
FIG. 3 is a partial schematic diagram of a magnetic member according to an embodiment of the invention.

The magnetic member 400 has a sheet structure. The detail structure of the magnetic member 400 is discussed below. Referring to FIG. 3, in this embodiment, the magnetic member 400 includes a magnetic layer 410 and an adhesive layer 420, wherein the magnetic layer 410 is attached to the adhesive layer 420. For example, the magnetic layer 410 can include metal powder or metal sheets, and the adhesive layer 420 can be a tape. The metal powder or the metal sheets can be smashed and attached to the tape by calendering, so as to form the magnetic member 400. The metal powder and the metal sheets can include Mn-Zn material, Ni-Zn material, nanocrystalline material, etc.

Owing to the aforementioned structure of the magnetic member 400, the magnetic member 400 is flexible. Therefore, when the magnetic member 400 winds around the primary conductor 300, it can be tightly attached to the first magnetic member 300. Moreover, owing to the aforementioned structure of the magnetic member 400, the magnetic member 400 can have a small thickness, and the miniaturization of the transformer T can be achieved. For example, in this embodiment, the thickness of the magnetic member 400 is 0.1 mm-0.3 mm (such as 0.2 mm).

When the magnetic member 400 is disposed between the primary conductor 300 and the secondary conductor 500, the magnetic layer 410 is disposed between the first conductive member 300 and the adhesive layer 420, and the primary conductor 300 and the secondary conductor 500 are respectively in contact with the magnetic layer 410 and the adhesive layer 420. The adhesive layer 420 is only adhesive on its surface 421 facing the magnetic layer 410, so as to facilitate the assembly of the secondary conductor 500.

Figure 4:
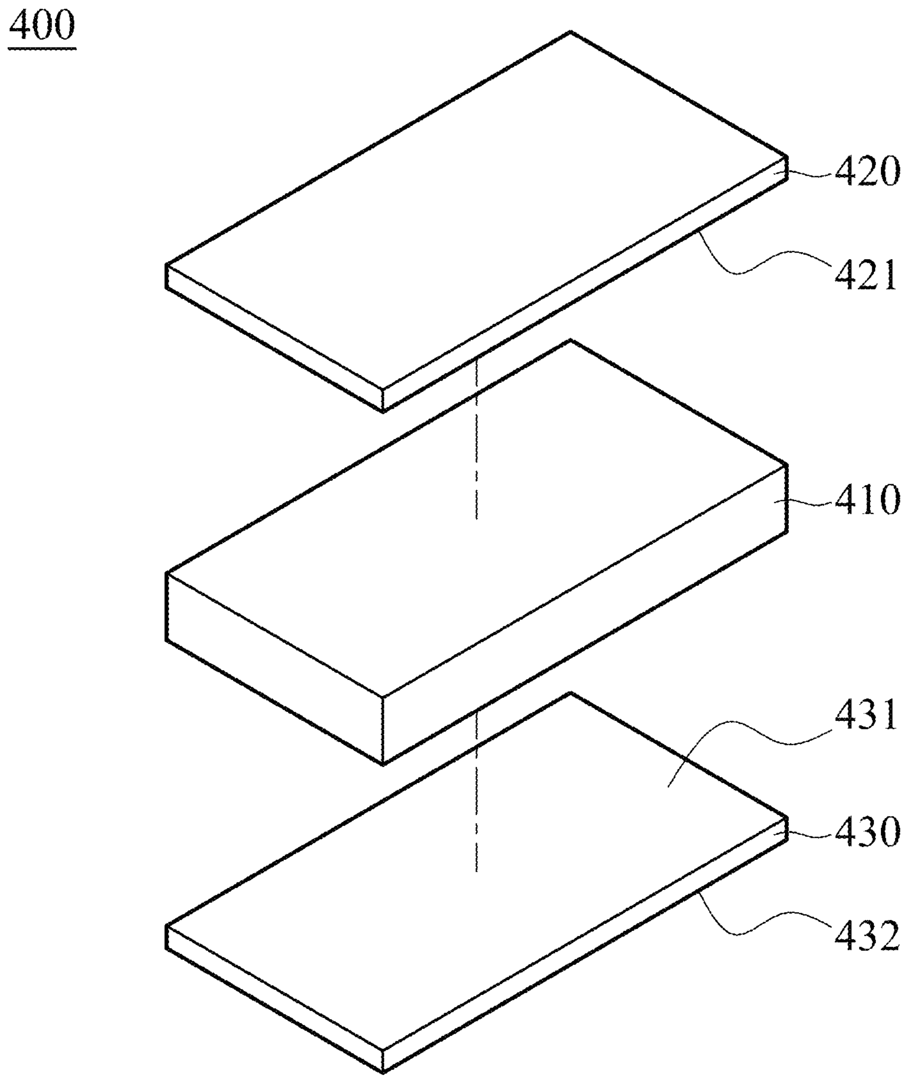
FIG. 4 is a partial schematic diagram of a magnetic member according to another embodiment of the invention.

Referring to FIG. 4, in another embodiment of the invention, the magnetic member 400 further includes an additional adhesive layer 430. The magnetic layer 410 is disposed between the adhesive layer 420 and the adhesive layer 430, and is attached to the adhesive layer 420 and the adhesive layer 430. When the magnetic member 400 is disposed between the primary conductor 300 and the secondary conductor 500, the adhesive layer 430 is disposed between the primary conductor 300 and the magnetic layer 410 and is in contact with the primary conductor 300. In this embodiment, the adhesive layer 430 is only adhesive on its surface 431 facing the magnetic layer 410, so as to facilitate the magnetic member 400 to wind around the primary conductor 300.

In some embodiments, the surface 432 of the adhesive layer 430 facing the primary conductor 300 can also include adhesiveness, so that the position of the magnetic member 400 can be affixed more securely.

Figure 5:
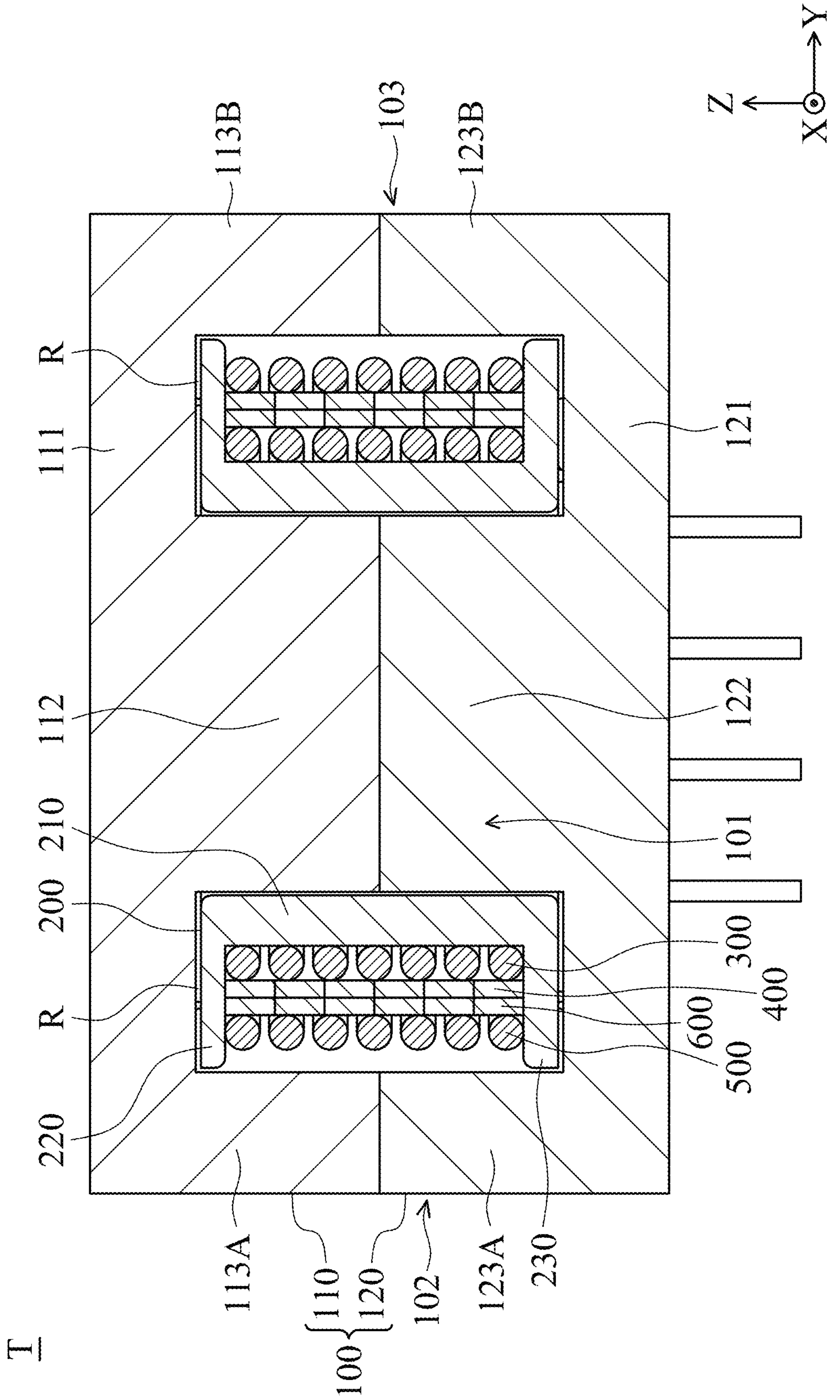
FIG. 5 is a schematic diagram of a transformer according to another embodiment of the invention.

Referring to FIG. 5, in another embodiment of the invention, the transformer T further includes an additional magnetic member 600 disposed between the magnetic member 400 and the secondary conductor 500. The structure of the magnetic member 600 is the same as that of the magnetic member 400, so that the features thereof are not repeated in the interest of brevity. It should be noted that the magnetic member 400 and the magnetic member 600 can be integrally formed as one piece. In other words, the magnetic member 400 and the magnetic member 600 can be an integrally formed strip. The portion of the strip winding around the primary conductor 300 can form the magnetic member 400, and the portion of the strip winding around the magnetic member 400 can form the magnetic member 600. In some embodiments, the strip-shaped magnetic member can wind more times to form more layers of the magnetic member between the primary conductor 300 and the secondary conductor 500.

Figure 6:
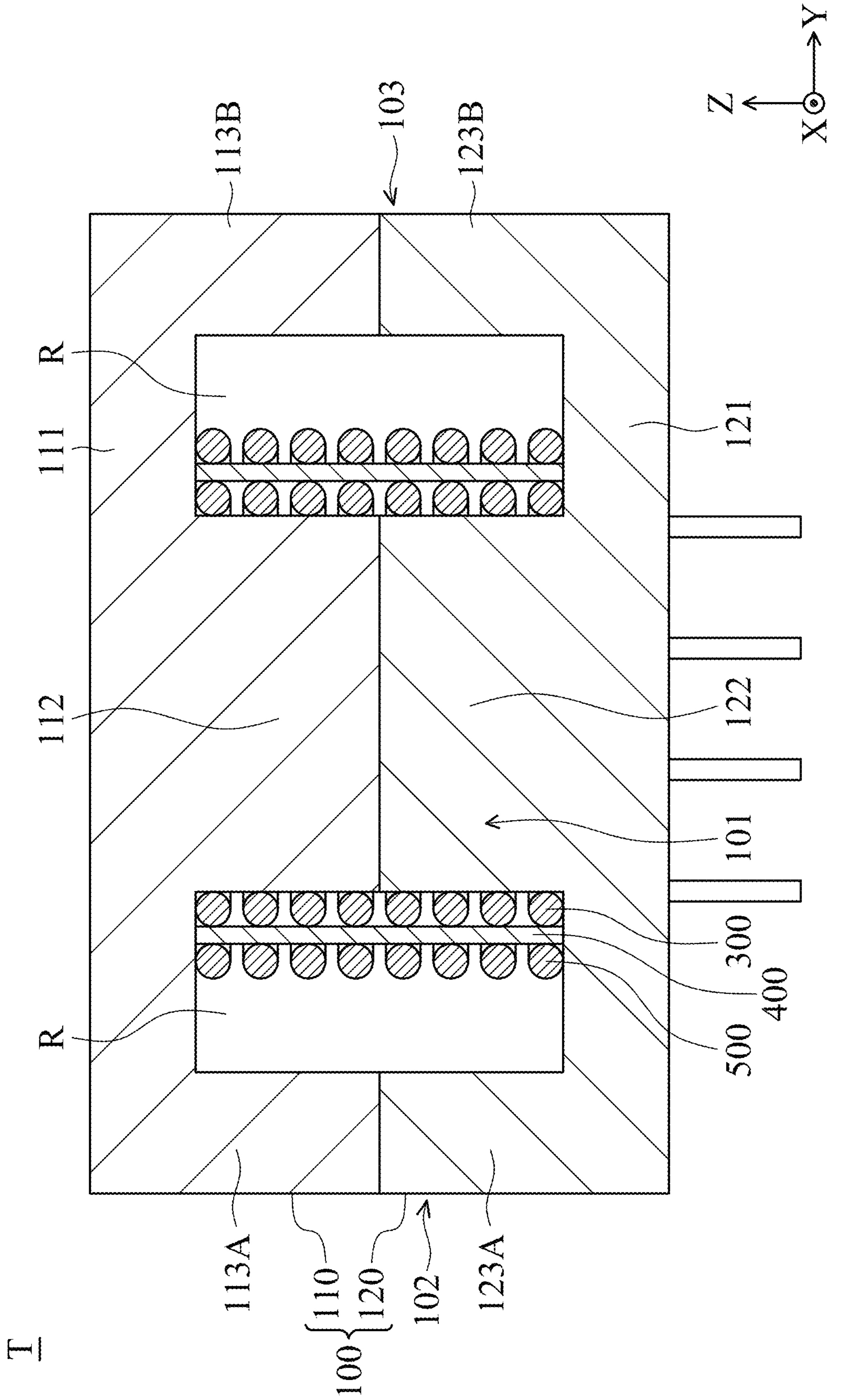
FIG. 6 is a schematic diagram of a transformer according to another embodiment of the invention.

Referring to FIG. 6, in another embodiment of the invention, the winding frame 200 of the transformer T can be omitted. The primary conductor 300 can directly wind around the central pillar 101 of the core 100. In this embodiment, the width of the magnetic member 400 is substantially the same as the distance between the top plate 111 and the bottom plate 121, and is in contact with the top plate 111 and the bottom plate 121.

Therefore, the user can adjust the leakage inductance of the transformer T by changing the number of the magnetic member between the primary conductor 300 and the secondary conductor 500.

In summary, a transformer is provided, including a core, a primary conductor, a magnetic member, and a secondary conductor. The core includes a central pillar and at least one lateral pillar, and an accommodating space is formed between the central pillar and the lateral pillar. The primary conductor, the magnetic member, and the secondary conductor are disposed in the accommodating space. The primary conductor surrounds the central pillar, the magnetic member surrounds the primary conductor, and the secondary conductor surrounds the magnetic member. The magnetic member is disposed between the primary conductor and the secondary conductor, and is flexible.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A transformer, comprising:

a core, comprising a central pillar and at least one lateral pillar, wherein an accommodating space is formed between the central pillar and the lateral pillar;

a primary conductor, disposed in the accommodating space and surrounding the central pillar;

a magnetic member, disposed in the accommodating space and surrounding the primary conductor; and a secondary conductor, disposed in the accommodating space and surrounding the magnetic member, wherein the magnetic member is disposed between the primary conductor and the secondary conductor, and the magnetic member is flexible, wherein the magnetic member comprises a magnetic layer and an adhesive layer, the magnetic layer is disposed between the primary conductor and the adhesive layer, the magnetic layer is attached to the adhesive layer, and the adhesive layer is only adhesive on a surface facing the magnetic layer.

2. The transformer as claimed in claim 1, wherein the transformer further comprises a winding frame, and the winding frame comprises:

a tube portion;

an upper extending portion, connected to an end of the tube portion and protruding from an outer surface of the tube portion; and a lower extending portion, connected to an opposite end of the tube portion and protruding from the outer surface of the tube portion, wherein the primary conductor surrounds the outer surface of the tube portion, and the primary conductor, the magnetic member, and the secondary conductor are disposed between the upper extending portion and the lower extending portion.

3. The transformer as claimed in claim 2, wherein the magnetic member is in contact with the upper extending portion and the lower extending portion.

4. The transformer as claimed in claim 2, wherein the central pillar passes through the tube portion, and the upper extending portion is disposed between the central pillar and the lateral pillar.

5. The transformer as claimed in claim 4, wherein the magnetic member further comprises an additional adhesive layer, the magnetic layer is disposed between the adhesive layer and the additional adhesive layer, and the magnetic layer is attached to the additional adhesive layer.

6. The transformer as claimed in claim 5, wherein the additional adhesive layer is only adhesive on the surface facing the magnetic layer.

7. The transformer as claimed in claim 5, wherein the additional adhesive layer is adhesive on the surface facing the magnetic layer and a surface facing the primary conductor.

8. The transformer as claimed in claim 1, wherein the magnetic member has a strip-shaped structure.

9. The transformer as claimed in claim 1, wherein the transformer further comprises an additional magnetic member disposed between the magnetic member and the secondary conductor.

10. The transformer as claimed in claim 9, wherein the magnetic member has a strip-shaped structure, and the additional magnetic member has a strip-shaped structure.

11. The transformer as claimed in claim 10, wherein the magnetic member and the additional magnetic member are integrally formed as one piece.

12. The transformer as claimed in claim 1, wherein the primary conductor and the secondary conductor are arranged along a direction that is perpendicular to an extending direction of the central pillar.

* * * * *